March 18, 1969 J. M. STEINKE 3,433,084

MECHANISM FOR PRODUCING INTERMITTENT ROTARY MOTION

Filed April 17, 1967 Sheet 1 of 2

INVENTOR
JAMES M. STEINKE

BY Louis A Kline
Albert L Sessler, Jr.
Elmer Wargo
HIS ATTORNEYS

March 18, 1969 J. M. STEINKE 3,433,084

MECHANISM FOR PRODUCING INTERMITTENT ROTARY MOTION

Filed April 17, 1967 Sheet 2 of 2

INVENTOR
JAMES M. STEINKE

BY

HIS ATTORNEYS

United States Patent Office 3,433,084

Patented Mar. 18, 1969

3,433,084
MECHANISM FOR PRODUCING INTERMITTENT ROTARY MOTION

James M. Steinke, Dayton, Ohio, assignor to The National Cash Register Company, Dayton, Ohio, a corporation of Maryland Filed Apr. 17, 1967, Ser. No. 631,198
U.S. Cl. 74—84 13 Claims
Int. Cl. F16h 27/04

ABSTRACT OF THE DISCLOSURE

A motion-translating device for producing intermittent rotary motion output from an input of constant velocity rotary motion. A train of three bevel gears and arcuately-shaped links is used to obtain the intermittent rotary motion. Latch means are added to the device to enable it to also produce an output of constant velocity rotation when desired.

BACKGROUND OF THE INVENTION

This invention relates to a motion-translating device, and more particularly it relates to a device which is provided with an input of constant velocity rotational motion, and which is selectively operable to produce two types of output motion; namely:

(a) Intermittent rotary motion, and
(b) Constant velocity rotary motion.

One of the problems encountered with prior art hesitation or intermittent rotary-motion mechanisms is that some of these mechanisms do not provide smooth, gradual acceleration and deceleration near the hesitation or dwell point, especially when these mechanisms are operated at high speeds.

In contrast with the above, applicant's device, which can be operated at high speeds, provides smooth acceleration and deceleration curves which have harmonic motion characteristics. This feature is especially useful in a drive mechanism for a tabulating-card transport mechanism.

One such card transport mechanism is used in a card reading apparatus as follows: The transport mechanism includes an endless-type conveyor belt (with spaced picker blades thereon) which passes under a card feed hopper in said apparatus. When the transport mechanism is actuated, a picker blade on the belt picks the lowermost card from the hopper as the belt moves thereunder, and the belt carries the card to a read station in the reading apparatus, where the belt is momentarily stopped to position the card in reading relationship with said read station. After the information is read from the card, the belt moves the card just read to a card collector pocket and simultaneously picks the next card to be read from the card feed hopper to repeat the reading process. Because the motion-translating device of the instant invention has smooth acceleration and deceleration operating curves and can operate at high speeds, it is especially useful to drive the conveyor belt in said card transport mechanism, thereby subjecting the cards picked from said feed hopper to gradual accelerations and decelerations while being transported at rates of approximately 1,200 cards per minute.

SUMMARY OF THE INVENTION

This invention relates to a motion-translating device which is provided with an input of constant velocity rotational motion and which is selectively operable to produce two types of output motion; namely:

(a) Intermittent rotary motion, and
(b) Constant velocity rotary motion.

The device includes an input means and an output means which are rotatably mounted in a frame means. Connecting means (which includes a rotatable member) is used to operatively connect said input means to the output means so as to produce a rotational, oscillatory motion at said output means as said input means is rotated. The connecting means is adaptable to be rotated around the axis of rotation of said input means. The device also includes a coupling means which is operatively connected to the rotatable member and which is adapted to be selectively operated in first and second modes of operation. When the coupling means is operated in said first mode, the connecting means is rotated about the axis of rotation of the input means, so that the rotational oscillatory motion previously mentioned is offset by the rotational motion of the connecting means about the axis of rotation of said input means to produce one dwell or zero velocity period of said output means relative to said input means at least once for a predetermined revolution or portion thereof of said input means. When the coupling means is operated in said second mode, it is effective to prevent the rotation of said rotatable member about its own axis but enables said connecting means to be rotated about the axis of rotation of said input means to thereby impart only a constant velocity rotational motion to said output means. Control means are provided for selectively operating said coupling means in said first and second modes of operation.

BRIEF DESCRIPTION OF THE DRAWINGS

FIGS. 6 through 9 are elevational views taken along the line C—C of FIG. 2 and showing the control means in different positions to effect the first and second modes of operation of the device, in which:

FIG. 6 shows the control means in position to effect the first mode of operation to produce an output of intermittent rotary motion;

FIG. 7 shows the control means in a transitory state from the first to the second mode of operation; that is, from intermittent rotary motion to constant velocity motion at the output shaft;

FIG. 8 shows the control means in position to effect the second mode of operation to produce an output of constant velocity; and FIG. 9 shows the control means in a transitory state from the second to the first mode of operation to produce an output of intermittent rotary motion.

DESCRIPTION OF THE PREFERRED EMBODIMENTS

Figures 1, 2, 4, 5:
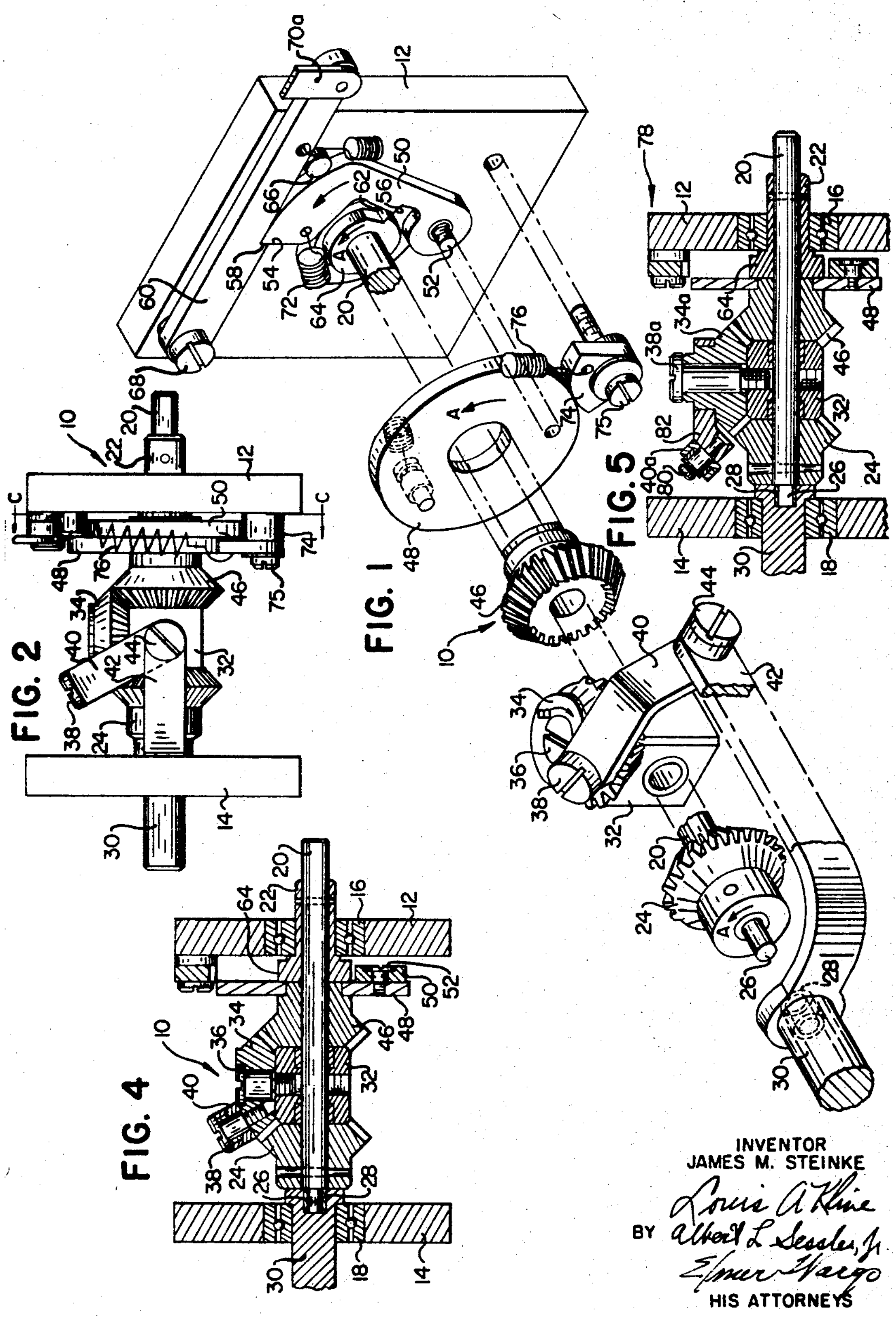
FIG. 1 is an exploded view, in perspective, of a first embodiment of the motion-translating device of this invention, showing the arrangement of input and output means, connecting means, coupling means, and control means for operating the device in its first and second modes of operation.
FIG. 2 is a side view, in elevation, of the first embodiment of the motion-translating device of this invention in assembled form.
FIG. 4 is a side, elevational view in cross-section and is taken along the line 4—4 of FIG. 3.
FIG. 5 is a side, elevational view in cross-section, similar to FIG. 4, but showing another embodiment of the device.

FIGS. 1 to 4 inclusive show a first modification of the motion-translating device 10 of this invention, in which the device is operated in the first mode of operation to produce an output of intermittent rotary motion while being supplied with an input of constant velocity rotation.

The device 10 includes an input means and an output means, which are rotatably mounted in a frame means as follows. The frame means includes planar support members 12 and 14, which are maintained in spaced, parallel relationship by conventional cross members (not shown). Also included in the frame means are bearings 16 and 18 (FIG. 4), which are mounted in suitable, aligned apertures in the support members 12 and 14, respectively. The input means includes an input shaft 20, which is inserted into a sleeve 22 (best shown in FIG. 4), which in turn is rotatably mounted in the bearing 16. The sleeve 22 is fixed to the shaft 20 to rotate therewith, and the function of the sleeve 22 will be later described in connection with the latch mechanism used in the control means for selectively operating the device in its first and second modes of operation, mentioned earlier. Near the left end of the shaft 20 (as viewed in FIG. 4), a bevel gear 24 is fixed thereto to rotate therewith. The extreme left end of the shaft 20 (FIG. 4) has thereon a reduced-diameter portion 26, which fits into a tubular bushing 28, which is inserted into a suitable bore in the flanged end of an output shaft 30, which in turn is rotatably mounted in the bearing 18. By this construction, the input and output shafts 20 and 30, respectively, are rotatably mounted in the frame means in axial alignment with each other.

The device also includes connecting means which operatively connect the input means with the output means to produce a rotational, oscillatory motion in the output means as follows. The connecting means includes a support member 32, which is shown in block form in FIGS. 1, 2, and 4 and which is rotatably mounted on the input shaft 20. A rotatable member 34, which is shown as a bevel gear, is rotatably mounted on the support member 32 by means of a suitable fastener 36, so that the axis of rotation of said gear is perpendicular to the axis of the input shaft 20, the gears 24 and 34 being in mesh with each other. Secured to the gear 34 away from the axis of the gear 34 is a fastener 38, having a longitudinal axis which sweeps out a cone of revolution when the gear 34 is rotated about its own axis. A first link 40, which is arcuate in shape, has one end pivotally joined to the fastener 38 and the remaining end pivotally joined to one end of the arcuate link 42 (FIGS. 1 and 3) by a fastener 44. The remaining end of the link 42 is joined to the output shaft 30 to rotate said shaft about its axis of rotation. When the input shaft 20 is rotated at a constant velocity in one direction, the gear 24 is also rotated to thereby rotate the gear 34 about its own axis (assuming that the support member 32 is stationary). As the gear 34 is rotated about its own axis, the link 40 is cranked therearound by the fastener 38 to impart a rotational, oscillatory motion to the output shaft 30 via the link 42. From the structure already described, it is apparent that the first connecting means (including the gear 34 and the links 40 and 42 as a group) can be rotated about the axis of the input shaft 20.

The coupling means mentioned previously, in the summary of the invention, is operatively connected to the rotatable member 34 of the connecting means just described, and is operated in first and second modes of operation as follows. The coupling means includes a bevel gear 46 (FIGS. 1 to 4 inclusive), which is rotatably mounted on the input shaft 20 and is in mesh with the gear 34. When the coupling means is operated in the first mode of operation, the gear 46 is fixed relative to the frame means but rotatably mounted relatively to the input shaft 20. When the coupling means is operated in the second mode of operation, the gear 46 is fixed to the input shaft 20 to rotate therewith. The control means previously mentioned, for selectively operating said coupling means in said first and second modes of operation, will be described later.

When the coupling means is operated in the first mode of operation (with the gear 46 fixed to the frame means), the following events occur. If the input shaft 20 is rotated at a constant velocity in a counter-clockwise direction A (as viewed in FIG. 1), the gear 24 also rotates in the same direction. Because the gear 34 is in mesh with the gears 24 and 46, and because the gear 46 is fixed relative to the frame means in this mode, the gear 34 rotates in a clockwise direction B about its own axis (FIG. 1), while the entire connecting means (including the support member 32 and the links 40 and 42) is rotated in a counter-clockwise direction (similar to direction A) about the axis of rotation of the input shaft 20. The rotational, oscillatory motion mentioned previously, which is imparted to the output shaft 30 by the gear 34 and the links 40 and 42, in combination with the rotary motion of said gear 34 and links 40 and 42 around the input shaft 20, produces a resultant zero dwell or hesitation in the output shaft 30 for a predetermined angular rotation of the input shaft 20.

When the coupling means is operated in the second mode of operation (with the gear 46 fixed to the input shaft 20 to rotate therewith), the following events occur. Because the gear 46 is fixed to the input shaft 20 in this mode, the gear 34 is held locked between the gears 24 and 46 and does not rotate about its own axis; however, the connecting means (including the support member 32, the gear 34, and the links 40 and 42) is rotated in a counter-clockwise direction A (FIG. 1) about the axis of the input shaft 20 at a constant velocity to produce a constant velocity, rotary motion at the output shaft 30.

The control means for selecting the first and second modes of operation of the motion-translating device 10 of this invention operates as follows. The control means includes a latch means, which is best shown in FIG. 1 The latch means includes a disc 48, which is fixed to the bevel gear 46 to rotate therewith, and the disc 48 has a latch member 50 pivotally joined to one side thereof by the fastener 52. The latch member 50 has first and second abutment areas 54 and 56, respectively, thereon, as shown. The abutment area 54 cooperates with a shoulder 58 on a control lever 60 in the first mode of operation of the device 10, and the abutment area 56 cooperates with a shoulder 62 on a disc 64 when said device is operated in the second mode. The disc 64 is integrally formed on the sleeve 22 (FIG. 4), mentioned previously.

Figure 6:
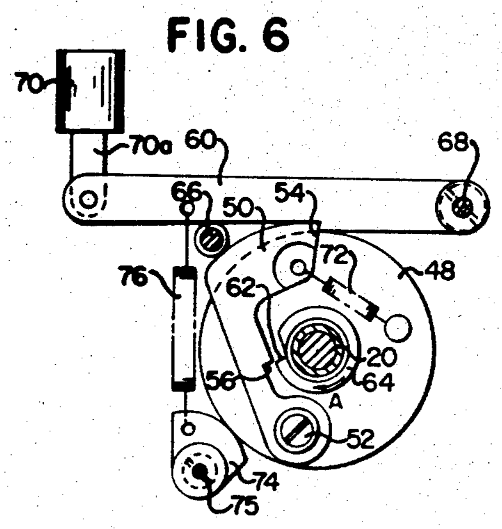

When the control means is in the first mode of operation, as shown particularly in FIGS. 1 and 6, the abutment area 54 on the latch member 50 engages the shoulder 58 on the control lever 60, and, because the latch member 50 becomes wedged against a pin 66, it cannot rotate counter-clockwise, as viewed in FIG. 1, and it thereby holds the disc 48 stationary relative to the frame means, which in turn holds the bevel gear 46 stationary.

Figure 7:
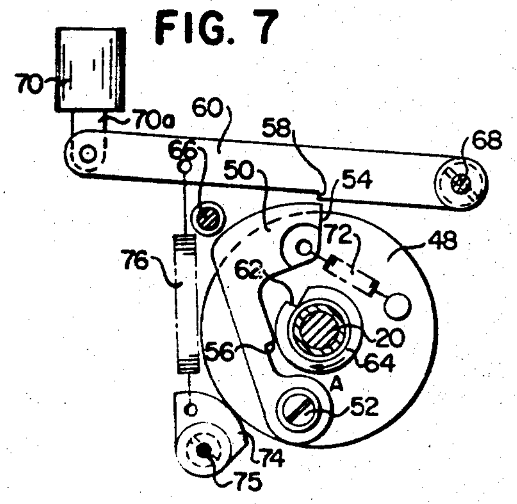
Figure 8:
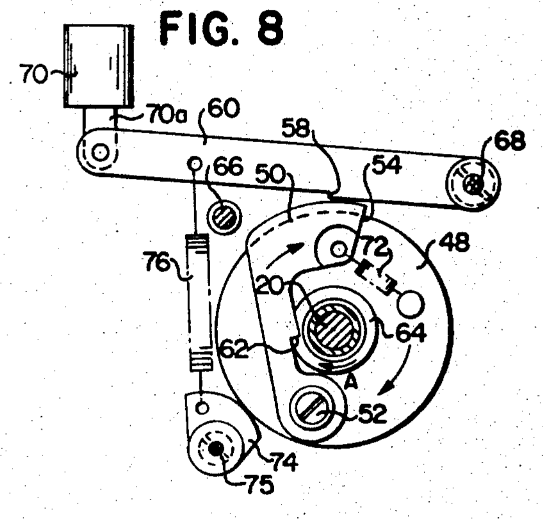
Figure 3:
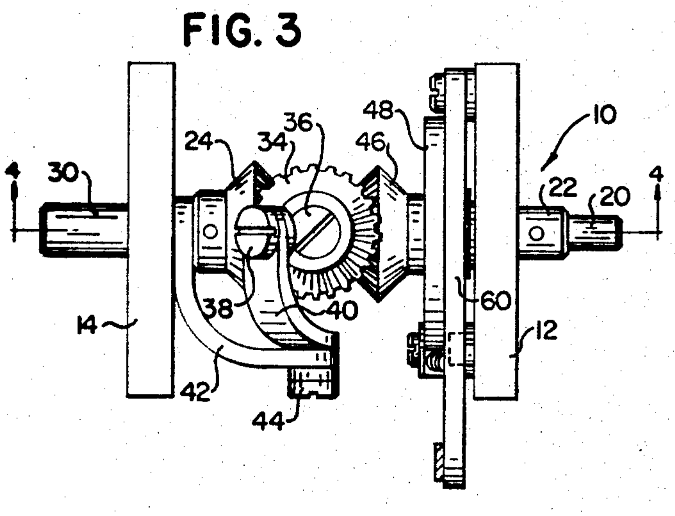
FIG. 3 is a top view of the device shown in FIG. 2.

When the control means is actuated to put the device 10 in the second mode of operation (constant velocity rotational output), the following events occur. As shown in FIG. 7, one end of the control lever 60 is pivoted about a fastener 68 (which is secured to the support member 12) to disengage the shoulder 58 of the control lever 60 from the abutment area 54 on the latch member 50. The pivotal movement of the lever 60 may be effected by any convenient means, as by an arm 70*a* of a solenoid 70, or by manual operation. After said shoulder 58 is free of the abutment area 54, a spring 72, which has one end secured to the disc 48 and the other end secured to the latch member 50, tends to pull the latch member 50 clockwise (as viewed in FIG. 7); however, because the disc 64 is rotating with the input shaft 20, the abutment area 56 on the latch member 50 merely rides on the periphery of the disc 64 until the shoulder 62 thereon completes its rotation in direction A to enable the spring 72 to pull the abutment area 56 into engagement with the shoulder 62. When the abutment area 56 and the shoulder 62 are engaged (FIG. 8), the latch member 50 and the disc 48 are rotated at the same constant velocity as is the input shaft 20 to produce constant velocity rotary motion at the output shaft 30, as previously explained. Of course, when the latch member 50 rotates with the disc 64, a clearance exists between the abutment area 54 and the shoulder 58 on the control member 60 (FIG. 8), and, correspondingly, when the latch member 50 is stationary relative to the disc 64 (FIG. 6); a clearance exists between the abutment area 56 on the latch member 50 and the shoulder 62 on the disc 64.

To assist in the engagement of the abutment area 56 of the latch member 50 with the shoulder 62 on the disc 64 when the control means is actuated to put the device in the second mode of operation, the cam member 74 is used. This cam member 74 is pivotally mounted on a fastener 75, which is secured to the support member 12, and it produces only a slight drag on the periphery of the disc 48 when the control lever is in the position shown in FIG. 6. When the control lever 60 is pivoted to clear its shoulder 58 from the abutment area 54 on the latch member 50, as shown in FIG. 7, an increased drag is put on the periphery of the disc 48 by the cam member 74 via a spring 76, which connects the lever 60 with the cam member 74. The increased drag on the disc 48 (FIG. 8) enables said disc to be held stationary relative to the frame means until the shoulder 62 on the disc 64 completes its rotation and engages the abutment area 56 on the latch member 50 to provide a rotational driving force which overrides said drag. If the disc 48 were not held stationary during the transition of the device from the first mode of operation to the second mode of operation, it would tend to be rotated counterclockwise (as viewed in FIG. 7) by the action of the spring 72 to produce a chatter when the disc member 64 rotates clockwise to engage the abutment area 56 on the latch member 50. To eliminate this chatter, the disc 48 is held stationary by the cam member 74 during said transition to enable the spring 72 to positively pull the latch member 50 clockwise and thereby bring the abutment area 56 into engagement with the shoulder 62 on the disc 64.

Figure 9:
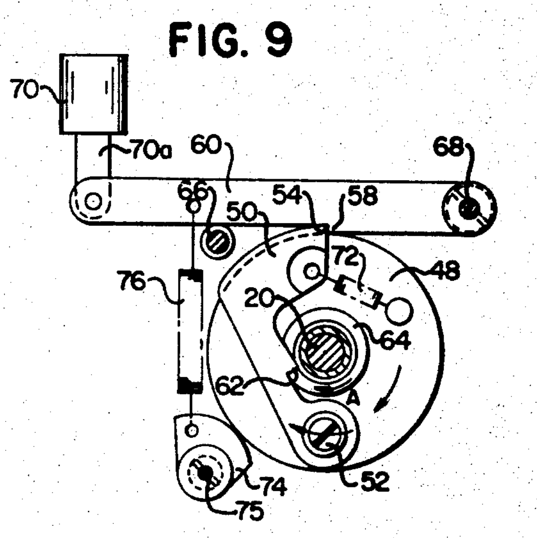

When the control means is actuated to put the device 10 back into the first mode of operation (intermittent rotary operation at the output shaft 30), the following events occur. As shown in FIG. 9, the solenoid 70 is deenergized to enable the shoulder 58 on the control lever 60 to be moved into the path of the abutment area 54 of the latch member 50. Because the disc 48 continues to be driven by the shoulder 62 on the disc 64, the end of the latch member 50 which is secured to the disc 48 by the fastener 52 begins to pivot (clockwise, as viewed in FIG. 9) about the opposite end of said latch member (at the shoulder 58 on the control lever 60) until the shoulder 62 on the disc 64 is disengaged from the abutment area 56 of said latch member. After disengagement, the end of the latch member 50, pinned by the fastener 52, continues to rotate slightly in a clockwise direction as viewed in FIG. 9, until said latch member abuts against the pin 66, as shown in FIG. 6, at which time a clearance will be provided between the abutment area 56 on said latch member and the shoulder 62 (FIG. 6) on the disc 64. When the control means is in the position shown in FIG. 6, the coupling means (gear 46) is in the first mode of operation.

The particular dimensions selected for specific embodiments will, of course, depend upon the particular application in which the motion-translating device 10 of this invention is used. In the embodiment shown in FIGS. 1 to 4 inclusive, all three bevel gears 24, 34, and 46 are identical, and the included angle between the longitudinal axis of the fastener 38 (to obtain the cranking motion) and the rotational axis of the gear 34 was 28.6 degrees. With such a construction, there was no actual stopping of the output shaft 30 relative to the input shaft 20, but merely a slowing down thereof. To obtain an actual stopping of the output shaft 30, said included angle had to be increased to approximately 45 degrees, as shown in FIG. 5.

The embodiment 78 shown in FIG. 5 is substantially the same as the device 10 shown in FIGS. 1 to 4 inclusive, except for the included angle between the longitudinal axis of the fastener 80, which is located along the pitch diameter of the gear 34*a*, and the rotational axis of the gear 34*a*, which, in FIG. 5, is 45 degrees. To obtain this larger included angle, a bracket 82 was secured to the gear 34*a* (which is similar to the gear 34 of FIG. 1 in other respects) to rotate therewith, and the first link 40*a* (similar to the link 40 of FIG. 1) was pivotally joined to the free end of the bracket 82 by the fastener 80. In the embodiment shown in FIGS. 1 to 4 inclusive, the rotational axis of the gear 34, the longitudinal axis of the fastener 38, and the longitudinal axis of the fastener 44 should intersect at a common point on the rotational axis of the input shaft 20; this same requirement is true for the embodiment shown in FIG. 5.

In order to simplify the drawing of this invention, only one connecting means (including the gear 34 and the links 40 and 42) is shown; however, to improve the dynamic balance of the device 10, a duplicate connecting means may be added to the device. When added, a gear (not shown), similar to the gear 34, would be rotatably mounted on the side of the support member 32 which is opposite to the side on which the gear 34 is mounted in FIG. 1. A first link, similar to the link 40, would be pivotally mounted on this gear in a manner similar to the mounting of the link 40 on the gear 34, and a second link, similar to the link 42, would have one end thereof secured to the output shaft 30 at a point diametrically opposed to the link 42 shown in FIG. 1. The remaining ends of the links similar to the links 40 and 42 would be joined as previously explained.

Because the gear 34 (FIG. 1) rotates about its own axis in the first mode of operation, a cranking motion is imparted to that end of the link 40 which is connected to the fastener 38, resulting in the link 40 having motion components which lie in three different planes which are mutually perpendicular to one another. For this reason, the link 40 may be considered a spatial link. This cranking motion imparted to the link 40 produces an oscillatory movement with harmonic motion characteristics which when combined with or added to the rotation of said connecting means about the axis of rotation of the input shaft produces an output which (1) is instantaneously at rest; (2) increases in speed according to harmonic motion characteristics; (3) reaches a maximum instantaneous velocity which is equal to the input rotational velocity; and (4) returns to instantaneous zero velocity according to harmonic motion characteristics. This is true when (a) all bevel gears 24, 34, and 46 are the same size; (b) the included angle between the longitudinal axis of the fastener 38 (FIG. 1) and the axis of rotation of the gear 34 is 45 degrees; and (c) the links 40 and 42 are arcuate segments subtending an angle of 90 degrees.

The control means for selecting the first and second modes of operation of the device is so arranged that the transfer from the first to the second mode of operation occurs at an instant in time when the output shaft 30 (FIG. 1) is at maximum velocity. It should be remembered that the maximum output velocity for the shaft 30 occurs when the rotational, oscillatory motion imparted by the gear 34 and the links 40 and 42 (FIG. 1) adds to the constant velocity motion imparted by the first connecting means as it rotates about the axis of rotation of the input shaft 20. This instant of maximum velocity occurs when the longitudinal axis of the fastener 38 and the rotational axis of the gear 34 lie in a common plane which also includes the axis of rotation of the input shaft 20 (FIG. 1), and, when this alignment occurs, the sleeve 22 can be pinned or secured to the input shaft 20 so as to bring the shoulder 62 of the disc 64 into engagement with the second abutment area 56 on the latch member 50. When said shoulder 62 and abutment area 56 are engaged, the output shaft 30 continues to rotate at the maximum output velocity, which is equal to the input velocity, for as long as the control means is operated in this second mode.

Naturally, different combinations of variations in gear sizes and links will produce different dwell or varying velocities in the output shaft; however, these combinations will be apparent to those skilled in the art and need not be recited herein.

What is claimed is:

1. A device for producing intermittent rotary motion comprising:

frame means;

input means rotatably mounted in said frame means, and having a constant velocity rotational motion;

output means rotatably mounted in said frame means;

connecting means operatively connecting said input means with said output means so as to produce a rotational, oscillatory motion at said output means as said input means is rotated, and including a rotatable member;

said connecting means being adaptable to be rotated around the axis of rotation of said input means; and coupling means cooperating with said rotatable member to enable said connecting means to be rotated at a constant velocity around the axis of rotation of said input means as said input means is rotated;

said input means including an input shaft and a first bevel gear fixed to rotate therewith;

said coupling means including a second bevel gear mounted on said shaft for relative movement therebetween but being fixed relative to said frame means;

said rotatable member being a third bevel gear having an axis of rotation perpendicular to said axis of said input means, and also being in mesh with said first and second bevel gears so as to operatively connect said input means with said coupling means;

said rotational, oscillatory motion produced by said connecting means being combined with the motion of said connecting means around said axis so as to produce a resultant zero, velocity of said output means relative to said input means at least once for a predetermined rotation of said input means.

2. The device as claimed in claim 1 in which said connecting means also includes:

a first link having one end pivotally joined to said third gear at a point away from the rotational axis of said third gear so as to be eccentrically connected thereto;

a second link having one end fixed to said output means to rotate it, the remaining end of said second link being pivotally joined to the remaining end of said first link; and a support member rotatably mounted on said input shaft and on which said support member said third bevel gear is rotatably mounted.

3. The device as claimed in claim 2 in which the axes of said input means and output means are coincident, and in which said first link has motion components which lie in three planes which are mutually perpendicular to one another.

4. A motion-translating device comprising:

frame means;

input means rotatably mounted in said frame means;

output means rotatably mounted on said frame means;

connecting means, including a rotatable member, with said rotatable member operatively connecting said input means with said output means so as to produce a rotational oscillatory motion at said output means when said rotatable member is rotated about its own axis of rotation by said input means;

said connecting means being rotatable around the axis of rotation of said input means;

coupling means operatively connected with said rotatable member, and adapted to be selectively operated in first and second modes of operation, said coupling means, when operated in said first mode, being fixed relative to said frame means, and when operated in said second mode, being fixed relative to said input means;

said coupling means, when operated in said first mode, cooperating with said rotatable member to enable said connecting means to be rotated around said axis of rotation of said input means at a constant velocity as said input means is rotated;

said rotational oscillatory motion produced by said connecting means being combined with the motion of said connecting means around said axis so as to produce a resultant zero velocity of said output means relative to said input means at least once for a predetermined rotation of said input means when said coupling means is operated in said first mode;

said coupling means, when operated in said second mode, being effective to prevent the rotation of said rotatable member about its own axis of rotation but enabling said connecting means to be rotated about said axis of rotation of said input means to thereby impart only a constant velocity rotational motion to said output means;

and control means for selectively operating said coupling means in said first and second modes of operation;

said input means including an input shaft and a first bevel gear fixed to rotate therewith;

said coupling means including a second bevel gear mounted on said input shaft for rotatable movement therewith; and said rotatable member being a third bevel gear having its axis of rotation perpendicular to said axis of said input means, and also being in mesh with said first and second bevel gears.

5. The device as claimed in claim 4 in which said connecting means also includes:

a first link having one end pivotally joined to said third gear at a point away from the rotational axis thereof so as to be eccentrically connected thereto;

a second link having one end fixed to said output means to rotate it, the remaining end of said second link being pivotally joined to the remaining end of said first link;

and a support member rotatably mounted on said input shaft, and on which said support member said third gear is rotatably mounted.

6. The device as claimed in claim 5 in which said control means comprising latch means selectively operable for latching said second gear to said frame means when said coupling means is to be operated in said first mode of operation, and for latching said second gear to said input shaft when said coupling means is to be operated in said second mode of operation.

7. The device as claimed in claim 6 in which said latch means comprises:

a first disc member fixed to said second gear to rotate therewith;

a second disc member fixed to said input shaft to rotate therewith, and being notched to provide an abutment area on the periphery thereof;

a latch member pivotally mounted on said first disc member and having first and second abutment areas thereon;

a lever pivotally mounted on said frame means for movement between first and second positions thereon, and having a shoulder thereon;

said shoulder on said lever when in said first position being effective to engage said first abutment area of said latch member and thereby restrain said latch member and first disc member against rotation relative to said frame means to thereby operate said coupling means in said first mode of operation; and spring means operative to bring said second abutment area of said latch member into engagement with said abutment area on said second disc member upon the disengagement of said first abutment area with said shoulder to thereby operate said coupling means in said second mode of operation.

8. The device as claimed in claim 7 further comprising:

spring means to urge said lever to its said first position, thereby causing said shoulder thereon to engage said first abutment stop on said latch member to thereby cause disengagement of said second abutment area of said latch member from said abutment area on said second disc member as said input shaft is rotated, to thereby return said coupling means to said first mode of operation; and cam means pivotally joined to said frame means and resiliently connected to said lever so as to hold said first disc member stationary relative to said frame means as said lever is moved from said first to said second position.

9. The device as claimed in claim 8 in which said second disc member is fixed to said input shaft so as to position said abutment area of said second disc member relative to said second abutment of said latch member to provide for engagement therebetween when said output means is rotating at its maximum velocity relative to said input means, said first link being pivotally joined to said third gear by a fastener whose longitudinal axis intersects the axis of rotation of said third bevel gear, said maximum velocity occurring when the longitudinal axis of said fastener and the axis of rotation of said third bevel gear lie in a common plane which also includes the axis of rotation of said input shaft.

10. The device as claimed in claim 4 in which said control means includes means for selectively fixing said coupling means to said frame when said coupling means is operated in said first mode and for fixing said coupling means to said input means for rotation therewith when said coupling means is operated in said second mode.

11. A motion summing device coupling comprising:

frame means;

input means rotatably mounted in said frame means;

output means rotatably mounted in said frame means; and connecting means being adapted to be rotated about the rotational axis of said input means at a constant velocity by said input means;

said connecting means operatively connecting said input means with said output means so as to produce a first component of constant velocity, rotational motion to said input means;

said connecting means including a link having motion components which lie in three planes which are mutually perpendicular to one another and which link is operatively connected to said input means;

said link, when moved by said input means, being effective to periodically produce a second component of rotational motion which opposes said first component to produce a periodic change in the velocity of said output means.

12. The device as claimed in claim 11 in which said connecting means further includes:

a rotable member which is operatively connected to said input means to be rotated about its own axis of rotation by said input means; and a second link having one end secured to said output means to rotate it;

said first-named link having one end pivotally joined to said rotatable member at a point away from its axis of rotation so as to be eccentrically connected thereto;

the remaining ends of said links being pivotally joined to each other.

13. The device as claimed in claim 12 in which the axes of rotation of said input and output means are coincident, and in which said links are arcuate segments with each said segment subtending an arc of ninety degrees.

References Cited

UNITED STATES PATENTS 3,355,956 12/1967 Beswick -------------- 74—84

MILTON KAUFMAN, *Primary Examiner.*

U.S. Cl. X.R.

308—10